(12) United States Patent
Kim

(10) Patent No.: US 10,394,213 B2
(45) Date of Patent: Aug. 27, 2019

(54) METHOD OF INDEPENDENT CONTROL PERIOD ALLOCATION OF AXIS IN THE PLC POSITIONING SYSTEM

(71) Applicant: LSIS CO., LTD., Gyeonggi-do (KR)

(72) Inventor: Seok-Yeon Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 248 days.

(21) Appl. No.: 15/293,215

(22) Filed: Oct. 13, 2016

(65) Prior Publication Data

US 2017/0108845 A1    Apr. 20, 2017

(30) Foreign Application Priority Data

Oct. 20, 2015 (KR) .................. 10-2015-0146342

(51) Int. Cl.
*G05B 19/29*    (2006.01)
*G05B 19/414*    (2006.01)
*G05B 19/05*    (2006.01)

(52) U.S. Cl.
CPC .............. *G05B 19/05* (2013.01); *G05B 19/29* (2013.01); *G05B 19/414* (2013.01);
(Continued)

(58) Field of Classification Search
CPC ...... G05B 19/05; G05B 19/29; G05B 19/414; G05B 2219/34323; G05B 2219/34411; G05B 2219/34412; G05B 2219/36507
See application file for complete search history.

(56) References Cited

U.S. PATENT DOCUMENTS 4,319,338 A * 3/1982 Grudowski .......... G05B 19/052
700/2
4,514,814 A * 4/1985 Evans ................ G05B 19/4141
700/169
(Continued)

FOREIGN PATENT DOCUMENTS

CN    1540467 A    10/2004
CN    101458509 A    6/2009
(Continued)

OTHER PUBLICATIONS

European Search Report dated Mar. 24, 2017 in corresponding European Application No. 16186659.5.
(Continued)

*Primary Examiner* — Kenneth M Lo
*Assistant Examiner* — Michael J Huntley
(74) *Attorney, Agent, or Firm* — K&L Gates LLP

(57) ABSTRACT

Disclosed embodiments relate to a method of independent control period allocation of axes in a PLC positioning system. In some embodiments, the method includes: dividing the axes into a first axis group including a first control period and a second axis group including a second control period and allocating different control periods for different axes; when position control calculation of the first axis group is requested during position control calculation of the second axis group, performing the position control calculation of the first axis group through task switching by an interrupt; and, after completing the position control calculation of the first axis group, resuming the position control calculation of the second axis group through task switching by an interrupt.

7 Claims, 10 Drawing Sheets

(52) U.S. Cl.
CPC ............. *G05B 2219/34323* (2013.01); *G05B 2219/34411* (2013.01); *G05B 2219/34412* (2013.01); *G05B 2219/36507* (2013.01)

(56) References Cited

U.S. PATENT DOCUMENTS

| | | | | |
|---|---|---|---|---|
| 5,453,933 A * | 9/1995 | Wright | ................ | G05B 19/414 700/181 |
| 5,670,855 A * | 9/1997 | Okunishi | ........... | G05B 19/4144 318/400.17 |
| 5,909,371 A * | 6/1999 | Rehm | ................ | G05B 19/414 700/169 |
| 5,926,389 A * | 7/1999 | Trounson | ............ | G05B 19/251 700/187 |
| 6,260,058 B1 | 7/2001 | Hoennigner et al. | | |
| 6,792,330 B1 | 9/2004 | Matsumoto et al. | | |
| 7,282,882 B2 | 10/2007 | Kitatsuji et al. | | |
| 9,645,850 B2 * | 5/2017 | David | ................ | G06F 11/0715 |
| 9,727,377 B2 * | 8/2017 | Martinez Canedo | ... | G06F 8/451 |
| 9,990,229 B2 * | 6/2018 | Fan | ....................... | G06F 9/4887 |
| 2001/0054055 A1 * | 12/2001 | Bollella | ............. | G06F 9/45533 718/102 |
| 2002/0029357 A1 * | 3/2002 | Charnell | ............. | G06F 8/4442 714/5.11 |
| 2002/0198970 A1 * | 12/2002 | Kuwa | ............... | G05B 19/0421 709/220 |
| 2003/0050725 A1 * | 3/2003 | Dimfeldner | ......... | G05B 19/408 700/174 |
| 2003/0139848 A1 * | 7/2003 | Cifra | .................... | G05B 19/414 700/245 |
| 2003/0149494 A1 * | 8/2003 | Wucherer | ........... | G05B 19/042 700/18 |
| 2003/0187907 A1 * | 10/2003 | Ito | ......................... | G06F 9/4887 718/102 |
| 2006/0153008 A1 * | 7/2006 | Miyamatsu | ........... | G05B 19/05 368/47 |
| 2007/0162906 A1 * | 7/2007 | Chandhoke | ............ | G06F 9/485 718/100 |
| 2007/0204087 A1 * | 8/2007 | Birenbach | ............ | G06F 9/4812 710/264 |
| 2009/0059951 A1 * | 3/2009 | Hayashi | ................ | G06F 9/3851 370/458 |
| 2010/0259209 A1 | 10/2010 | Nagato | | |
| 2012/0029657 A1 * | 2/2012 | Yagura | ................ | G05B 19/056 700/11 |
| 2012/0239172 A1 * | 9/2012 | Nishiyama | ............ | G05B 19/05 700/86 |
| 2012/0260239 A1 * | 10/2012 | Martinez Canedo | .. | G05B 19/05 717/149 |
| 2012/0291035 A1 * | 11/2012 | Barth | ................. | G05B 19/0421 718/102 |
| 2012/0291036 A1 * | 11/2012 | Taira | ...................... | B25J 9/1656 718/102 |
| 2013/0081054 A1 * | 3/2013 | Holembowski | ........ | G05B 19/05 718/107 |
| 2013/0124184 A1 * | 5/2013 | Sakaguchi | ......... | G05B 19/4069 703/22 |
| 2013/0254584 A1 * | 9/2013 | Tamaoki | ................ | G05B 19/05 713/401 |
| 2014/0012402 A1 * | 1/2014 | Nishiyama | ............. | G05B 19/05 700/86 |
| 2014/0163738 A1 | 6/2014 | Suzuki | | |
| 2014/0207254 A1 * | 7/2014 | Nishiyama | ............. | G05B 19/04 700/11 |
| 2015/0277977 A1 * | 10/2015 | Vrind | .................... | G06F 9/4881 718/104 |
| 2015/0293787 A1 * | 10/2015 | Bilavarn | ............... | G06F 9/4881 718/102 |
| 2016/0062348 A1 * | 3/2016 | Ogino | ................. | G05B 19/4141 700/2 |
| 2017/0075334 A1 * | 3/2017 | Yaoita | .................... | G05B 19/05 |

FOREIGN PATENT DOCUMENTS

| | | | |
|---|---|---|---|
| CN | 102130640 A | 7/2011 | |
| CN | 202094830 U | 12/2011 | |
| CN | 102629119 A | 8/2012 | |
| CN | 102854901 A | 1/2013 | |
| CN | 103123476 A | 5/2013 | |
| CN | 103403631 A | 11/2013 | |
| EP | 0347467 A1 | 12/1989 | |
| EP | 1342699 A1 | 9/2003 | |
| EP | 2515189 A1 * | 10/2012 | ............. G05B 19/05 |
| JP | 2006187826 A | 7/2006 | |
| JP | 2007-140655 A | 6/2007 | |
| JP | 2012-194670 A | 10/2012 | |
| JP | 5416594 B2 | 2/2014 | |
| KR | 20040071921 A | 8/2004 | |
| KR | 101271854 B1 | 6/2013 | |
| KR | 20150074392 A | 7/2015 | |
| WO | 96/33450 A1 | 10/1996 | |

OTHER PUBLICATIONS

Japanese Office Action dated Sep. 12, 2017 in connection with the counterpart Japanese Patent Application.

Chinese Office Action for related Chinese Application No. 201610839540.8; action dated Nov. 6, 2018; (7 pages).

\* cited by examiner

PRIOR ART

PRIOR ART

METHOD OF INDEPENDENT CONTROL PERIOD ALLOCATION OF AXIS IN THE PLC POSITIONING SYSTEM

CROSS REFERENCE TO RELATED APPLICATION

This application claims the benefit of Korean Patent Application No. 10-2015-0146342, filed on Oct. 20, 2015, entitled "A METHOD OF INDEPENDENT CONTROL PERIOD ALLOCATION OF AXIS IN THE PLC POSITIONING SYSTEM", which is hereby incorporated by reference in its entirety.

BACKGROUND

Technical Field

The present disclosure relates to a method of independent control period allocation of axes in a programmable logic controller (PLC) positioning system. More specifically, in some embodiments, the present disclosure relates to a method of independent control period allocation of axes in a PLC positioning system controlling a plurality of axes, in which the axes are divided into a first axis group requiring a faster response and a second axis group requiring a slower response and a task is switched at a point of time when position control calculation of the first axis group is requested, so as to perform the position control calculation of the first axis group in preference to position control calculation of the second axis group.

Description of the Related Art

A positioning function of a programmable logic controller (PLC) is a function of moving an object to a correct position by driving a motor with a fast pulse train output to a transistor output contact point of the PLC.

With increase in the complexity of an automatic control system, a variety of applications for controlling a number of axes with a single controller have been developed. However, the existing direct servo-drive control based on a pulse or an analog signal has a limitation in the number of controllable servo-drives since input/output contact points are connected to servo-drives in a one-to-one correspondence.

However, in recent years, beyond the above-mentioned method, other methods of using networking technologies to transmit a target position and speed to a number of servo-drives in real time have been utilized.

As one example, an EtherCAT protocol may be used to provide instruction values and control data to 100 servo-axes every 100 μs. However, it is difficult to calculate the movement of each of the 100 servo-axes every 100 μs. Of course, an MPU with high performance may help to reduce calculation time, but cannot avoid any inherent limitation.

A PLC positioning system calculates a pulse to be output every control period defined in unit time. The control period typically varies within a range from several hundred μm to several ten ms depending on makers and products. A frequency of a pulse output during a control period is constant and a speed (i.e., frequency) of a pulse to be output for the next control period is determined. Therefore, a shorter control period facilitates smoother motor control.

FIGS. 1 and 2 are diagrams used to explain a position control calculation method of a conventional PLC positioning system.

Referring to FIGS. 1 and 2, an amount of movement of an axis to be moved within a control period for each axis from the beginning of the control period of each interval is calculated (S1). In general, calculation from the first axis to the last axis (varying depending on products) is completed. Upon completing the calculation, a task waits for the remaining time of the corresponding control period or the remaining task required for control is proceeding (S2). During the next control period after completing the calculation, the amount of movement calculated in the previous control period is output to a servo-drive and, in the corresponding control period, an amount of movement during the second next control period of each axis is calculated (S3). The amount of movement calculated in the first control period is output during the second control period. The amount of movement calculated at this time is stored in an output buffer and is later output.

The above-described method has to allocate a control period in consideration of the maximum calculation time of all axes since the control periods of the axes are same. For example, if a system having 10 axes of the same kind whose calculation time is the maximum of 1 ms is to be controlled, the control period has to be allocated to 10 ms at minimum.

FIG. 3 is a diagram used to explain a case where a period of time taken to calculate all axes exceeds a control period in the conventional PLC positioning system.

Referring to FIG. 3, although an amount of movement of axes whose calculation is completed within the first control period including the first axis and the second axis is transferred to a servo-drive normally during the next control period, an axis whose calculation is not completed within the first control period (first interval) has no amount of movement to be output during the next control period.

Therefore, an $n^{th}$ axis has no actual output in the second interval. Accumulation of such an effect may cause an increasing position error. Therefore, if all axes are to be controlled with the same control period, position control calculation of all axes has to be completed with an allocated control period.

However, the control period has an effect on responsiveness and flexibility of the control system. A longer control period leads to a slower response at an end-point as much, which has a direct effect on a yield of products.

In addition, since a rate of speed change in an acceleration/deceleration interval increases, there is a high possibility of a failure due to a mechanical shock. Therefore, there is a need for a novel method for calculation of multiple axes.

SUMMARY

It is an aspect of some embodiments of the present disclosure to provide a method of independent control period allocation of axes in a PLC positioning system controlling a plurality of axes, in which the axes to be controlled are divided into a first axis group requiring a faster response and a second axis group requiring a slower response and a task is switched at a point of time when position control calculation of the first axis group is requested, so as to perform the position control calculation of the first axis group in preference to position control calculation of the second axis group, in order to flexibly control all the axes.

The present disclosure is not limited to the above aspect and other aspects of the present disclosure will be clearly understood by those skilled in the art from the following description.

In accordance with one aspect of some embodiments of the present disclosure, there is provided a method of independent control period allocation of axes in a PLC positioning system, including: dividing the axes into a first axis group including a first control period and a second axis group including a second control period and allocating different control periods for different axes; when position control calculation of the first axis group is requested during position control calculation of the second axis group, performing the position control calculation of the first axis group through task switching by an interrupt; and, after completing the position control calculation of the first axis group, resuming the position control calculation of the second axis group through task switching by an interrupt.

The act of allocating different control periods for different axes may include designating a single axis to the first axis group.

The act of allocating different control periods for different axes may include designating a plurality of axes to the first axis group.

In the act of allocating different control periods for different axes, each of the first control period and the second control period may include a position control calculation execution interval and a margin interval for each of the axes.

The act of resuming the position control calculation of the second axis group includes: when completing the position control calculation of the first axis group during the position control calculation execution interval of the first control period, performing task switching for the position control calculation of the second axis group; and resuming the position control calculation of the second axis group during the margin interval of the first axis group.

The act of allocating different control periods for different axes may further include allocating a stack of an Interrupt Stack Pointer (ISP) area for axes in the first axis group and allocating a stack of a User Stack Pointer (USP) area for axes in the second axis group.

The act of allocating different control periods for different axes may include designating the first control period so that calculation of an axis using the ISP area can be completed within the first control period.

The act of performing the position control calculation of the first axis group may include: while performing the control calculation of the second control group, when a stack switching interrupt occurs at a point of time when the position control calculation of the first control period is requested, pushing all registers to the USP area, and, after completion of an interrupt service routine, changing a return address to a first control period calculation area so as to return to the ISP area, and the act of resuming the position control calculation of the second axis group may include: when completing the control calculation of the first control period, pushing a general register, a state register and a program counter to the ISP area and, after stack switching to the USP area, resuming to perform the control calculation of the second control period.

According to some embodiments of the present disclosure, in a method of independent control period allocation of axes in a PLC positioning system controlling a plurality of axes, beyond the existing way of applying control periods collectively, it is possible to divide the axes into a first axis group (requiring a faster response) and a second axis group (requiring a slower response) and switch a task at a point of time when position control calculation of the first axis group is requested during calculation of operation data of the two axis groups, so as to perform the position control calculation of the first axis group in preference to position control calculation of the second axis group, in order to flexibly control all the axes.

According to some embodiments of the present disclosure, since a calculation priority is granted to an axis requiring a faster response, it is possible to guarantee a response speed of the axis requiring the faster response even with the increased number of control axes.

In the industrial fields, there are axes which are more sensitive to a response speed and axial synchronization, as in articulated robots and the like, and axes which are less sensitive to a response speed and axial synchronization, as in conveyer belts and the like. According to some embodiments of the present disclosure, by allocating axes controlling the articulated robots and the like to the first axis group and allocating axes controlling the conveyer belts and the like to the second axis group, it is possible to flexibly control a servo-drive even in a large-scaled system.

DETAILED DESCRIPTION

Hereinafter, embodiments of the present disclosure will be described in detail with reference to the accompanying drawings. It should be understood that the present disclosure is not limited to the following embodiments, and that some embodiments are provided for illustrative purposes only. The scope of the disclosure should be defined only by the accompanying claims and equivalents thereof.

Figure 1:
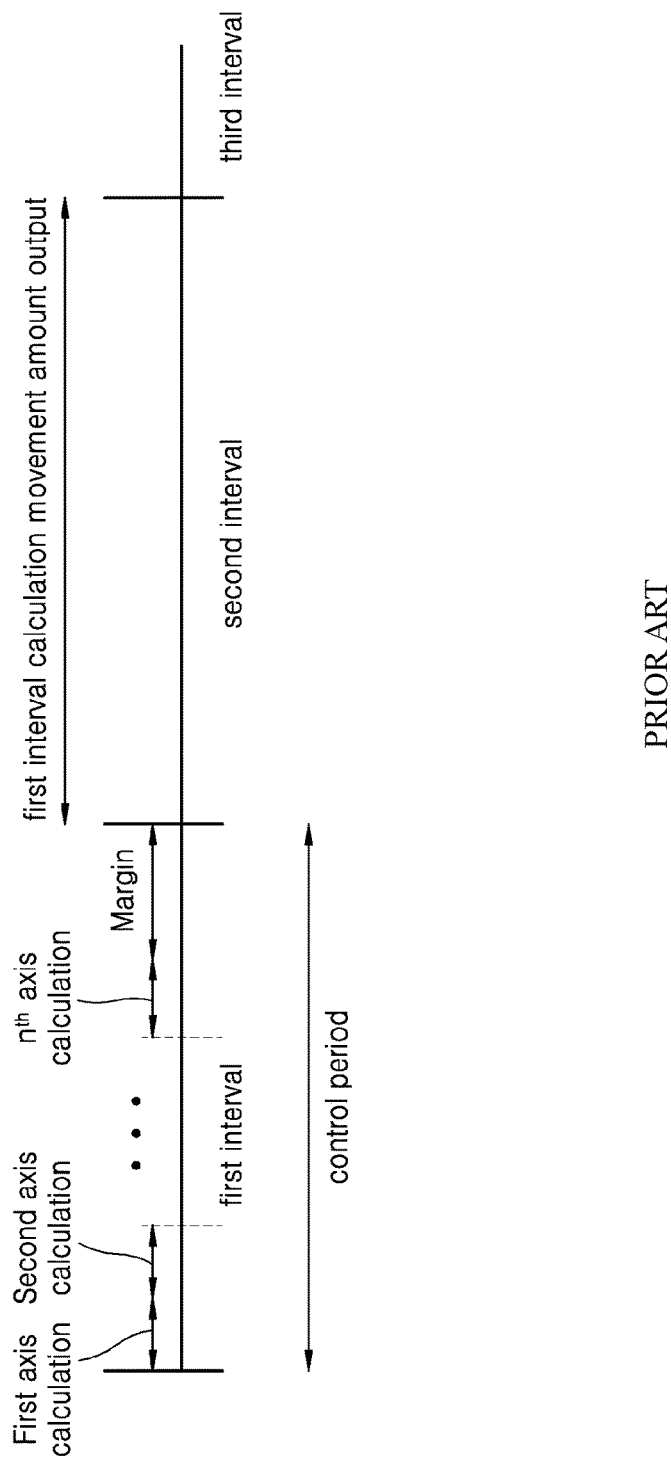
FIG. 1 is a diagram used to explain a position control calculation method of a conventional PLC positioning system, according to the prior art.
Figure 2:
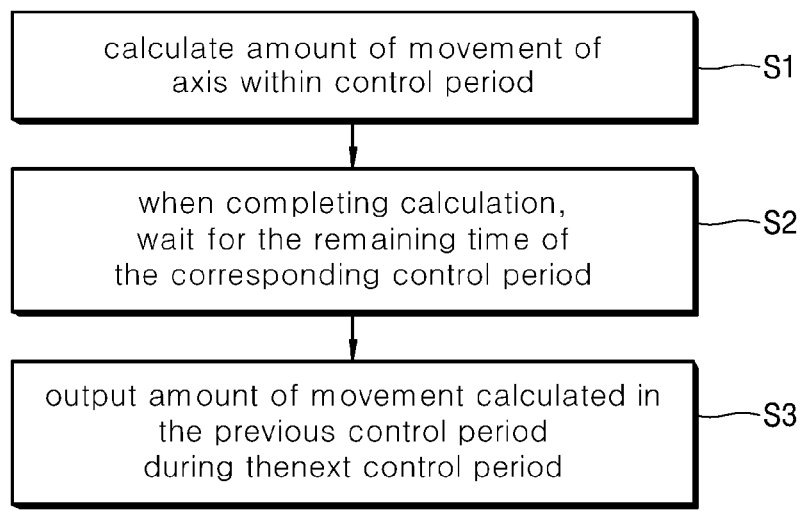
FIG. 2 is a flow chart used to explain the position control calculation method of the conventional PLC positioning system, according to the prior art.
Figure 3:
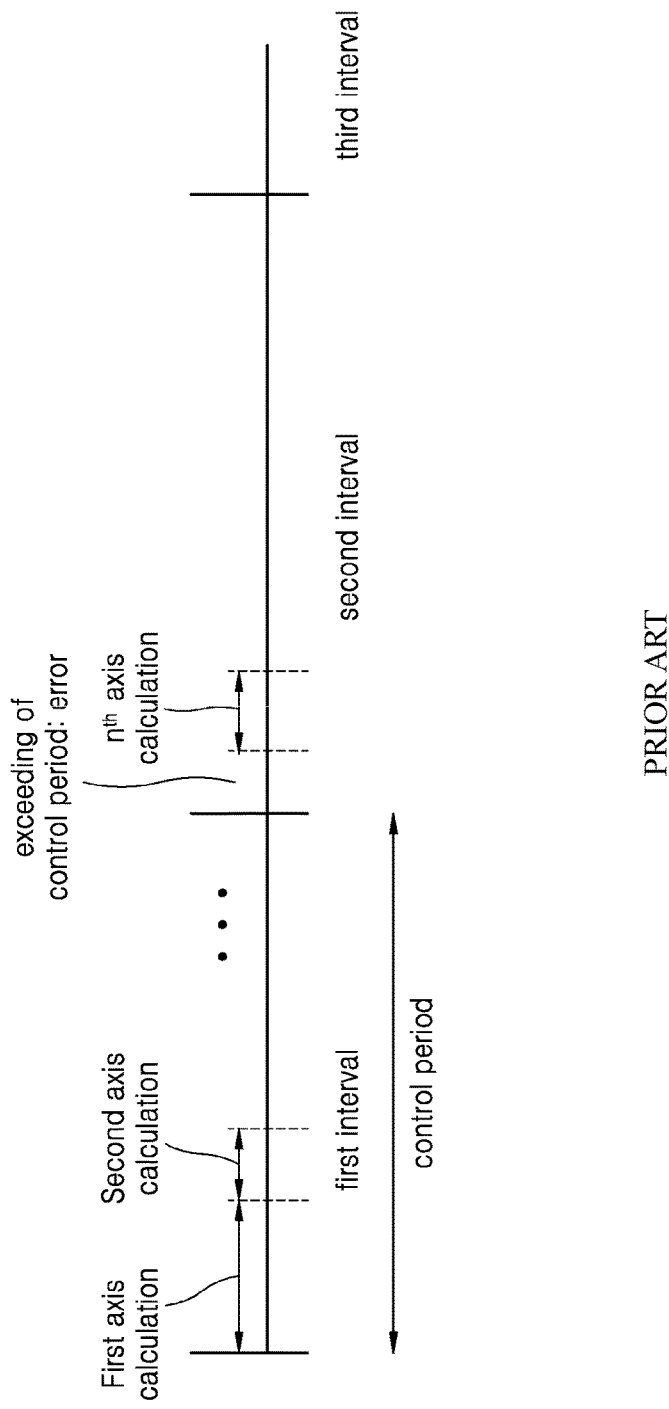
FIG. 3 is a diagram used to explain a case where a period of time taken to calculate all axes exceeds a control period in the conventional PLC positioning system, according to the prior art.
Figure 4:
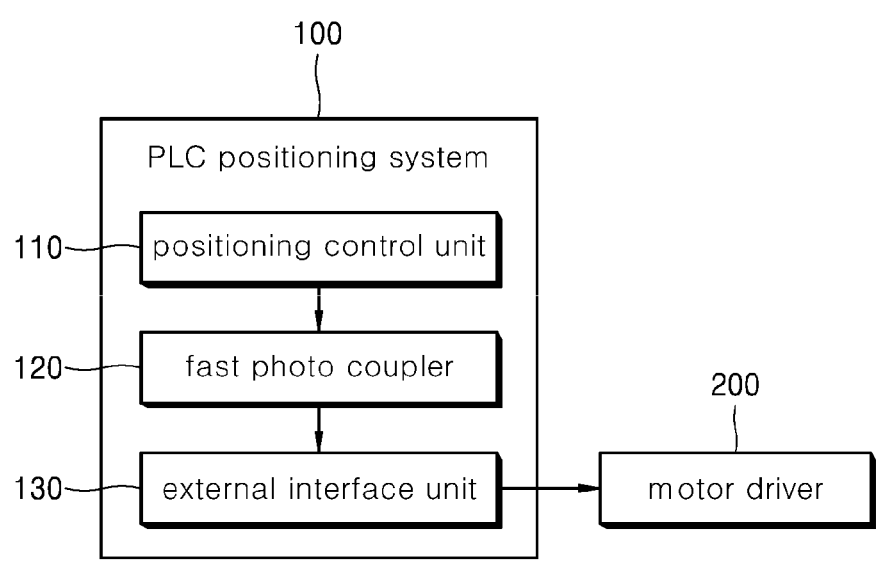
FIG. 4 is a block diagram used to explain a PLC positioning system according to some embodiments of the present disclosure.

FIG. 4 is a block diagram used to explain a PLC positioning system according to some embodiments of the present disclosure.

Referring to FIG. 4, a PLC positioning system 100 according to some embodiments of the present disclosure may be configured to include a positioning control unit 110, a fast photo coupler 120 and an external interface unit 130.

The positioning control unit 110 is configured to divide axes into a first axis group and a second axis group, switch a task at a point of time of request for first axis group calculation of operation data calculation of the two groups, and preferentially perform position control calculation of the first group. Axes requiring a faster response belong to the first axis group. Axes requiring a slower response belong to the second axis group.

The positioning control unit 110 may designate one axis for the first axis group and designate the remaining axes for the second axis group. Thus, calculation for the axis designated for the first axis group can be executed in preference to the remaining axes.

The positioning control unit 110 may designate a plurality of axes for the first axis group and designate the remaining axes for the second axis group. Thus, calculation for the plurality of axes designated for the first axis group can be executed in preference to the remaining axes.

For example, the positioning control unit 110 may designate two axes for the first axis group and designate the remaining axes for the second axis group. Thus, calculation for the two axes designated for the first axis group can be executed in preference to the remaining axes. At this time, the two axes designated for the first axis group include the same priority. With the increase number of axes designated for the first axis group increases, as the designated axes share the same priority, it is advantageous to set the number of axes designated for the first axis group to be as small as possible, preferably one.

The positioning control unit 110 may generate a fast pulse train according to a pulse/direction or CW/CCW output mode and a high-active or low-active output level set by a user. The fast pulse train is transmitted to the outside through the fast photo coupler 120, which serves as an insulating transmission unit, in a state where the fast pulse train is electrically isolated from the outside. The fast pulse train is converted by the external interface unit 130 to a signal level of an open collector or line drive form suitable to an external motor driver 200.

Figure 5:
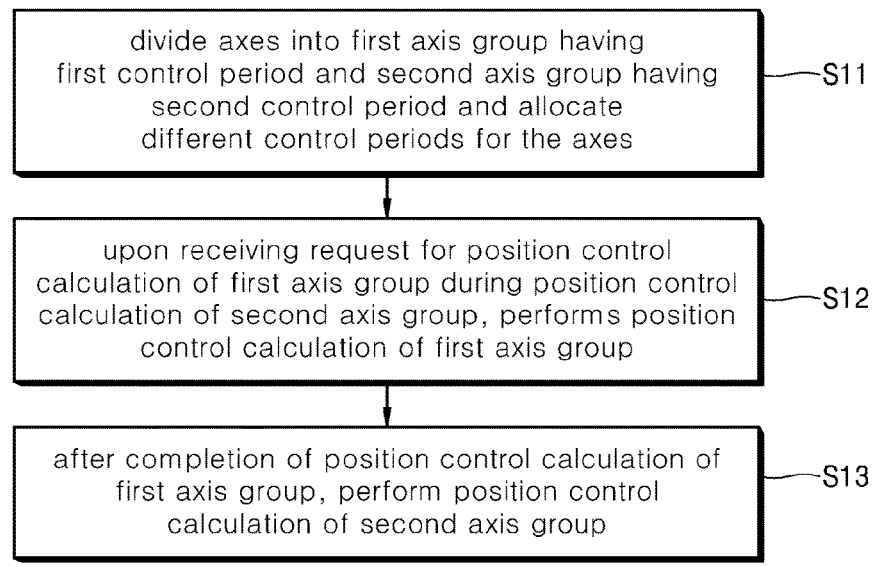
FIG. 5 is a flow chart used to explain a method of independent control period allocation of axes in the PLC positioning system according to some embodiments of the present disclosure.

FIG. 5 is a flow chart used to explain a method of independent control period allocation of axes in the PLC positioning system according to some embodiments of the present disclosure.

Referring to FIG. 5, the positioning control unit 110 divides the axes into the first axis group including a first control period and the second axis group including a second control period and allocates different control periods for the axes (S11).

That is, the positioning control unit 110 uses task switching to allocate different control periods for the axes in such a manner that a shorter control period (the first control period) is allocated to an axis requiring a faster response and a longer period (the second control period) is allocated to an axis requiring a slower response.

For example, the positioning control unit 110 divides the axes into a servo-drive group requiring a shorter control period (the first axis group), such as an articulated robot or the like, and a servo-drive group requiring a longer control period (the second axis group), such as a conveyer belt or the like. Then, the positioning control unit 110 sets a position control calculation priority of the first axis group to be higher than a position control calculation priority of the second axis group.

That is, upon receiving a request for position control calculation of the first axis group during position control calculation of the second axis group, the positioning control unit 110 performs the position control calculation of the first axis group (S12). Then, after completion of the position control calculation of the first axis group, the positioning control unit 110 performs the position control calculation of the second axis group (S13). This process can guarantee the shorter control period of the first axis group instead of increasing the control period of the second axis group.

The positioning control unit 110 may be implemented with MPU (Micro Process Unit). In this case, the positioning control unit 110 may perform independent control period allocation by using task switching using internal peripherals of the MPU.

If RTOS (Real Time Operating System) is used to implement the task switching technique, this may cause loads having much necessary periodic/aperiodic scheduling, which may lead to waste of MPU resources.

Therefore, the positioning control unit 110 can perform a process capable of flexible task switching at the time of occurrence of a timer interrupt of functions of the RTOS.

That is, the positioning control unit 110 stops ongoing calculation at the time of request of position calculation of an axis including a shorter control period during position calculation of an axis including a longer control period and preferentially performs the position calculation of the axis including the shorter control period. Upon completion of the position calculation of the axis including the shorter control period, the positioning control unit 110 resumes to perform the position calculation of the axis including the longer control period.

To this end, the positioning control unit 110 provides two axis control rules as follows.

First, at the time of request of position calculation of an axis including a shorter control period during position calculation of an axis including a longer control period, a position control calculation routine for the axis including the shorter control period should be immediately performed.

Second, upon completion of the position calculation of the axis including the shorter control period, the position control calculation of the axis including the longer control period should be resumed.

The task switching technique is required to flexibly implement position control calculation of axes including different control periods. Typical RTOS uses a time tick or a call of API function with which a kernel works to switch a task. When a kernel function is called, a kernel scheduler executes a task including the highest priority among tasks which are currently in a standby state.

However, the time tick of the typical embedded RTOS is 10 ms and, typically, a control period of about 1 ms is basically provided for positioning control. This may cause more works performed for task switching than necessary, which may impose a burden on the system. Therefore, there is a need of an appropriate way for the positioning control unit 110 to perform task switching by utilizing only a multitasking technique on Non-RTOS.

The task switching requires stack segmentation which may be arbitrarily implemented by a user with source codes. For example, the positioning control unit 110 may employ a stack segmentation scheme which can use ISP (Interrupt Stack Pointer) and USP (User Stack Pointer). The positioning control unit 110 can determine through control register manipulation whether to use an ISP area or a USP area for a current stack.

Figure 6:
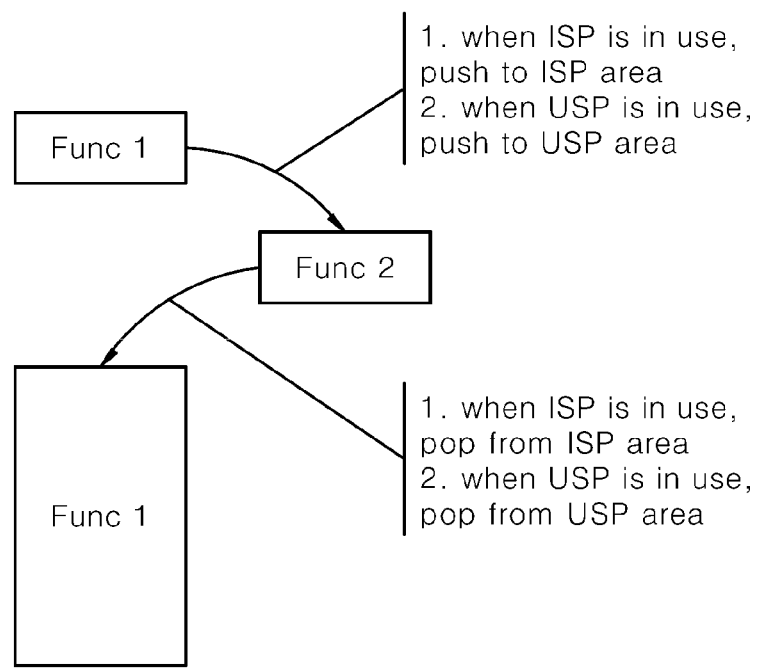
FIG. 6 is a diagram illustrating a storage area of a current stack at a function call in the method of independent control period allocation of axes in the PLC positioning system according to some embodiments of the present disclosure.

FIG. 6 is a diagram illustrating a storage area of a current stack at a function call in the method of independent control period allocation of axes in the PLC positioning system according to some embodiments of the present disclosure.

Referring to FIG. 6, the positioning control unit 110 may receive a function call so as to perform a task of Func2 while performing a task of Func1. At this time, a push area and a pop area differ from each other depending on whether to use the ISP area or the USP area.

When the ISP area is used, if there is a function call for performing the task of Func2 while performing the task of Func1, the positioning control unit 110 pushes to the ISP area. Then, after completion of the task of Func2, when the task of Func2 is switched to the task of Func1, the positioning control unit 110 pops from the ISP area.

On the other hand, when the USP area is used, if there is a function call for performing the task of Func2 while performing the task of Func1, the positioning control unit 110 pushes to the USP area. Then, after completion of the task of Func2, when the task of Func2 is switched to the task of Func1, the positioning control unit 110 pops from the USP area.

Figure 7:
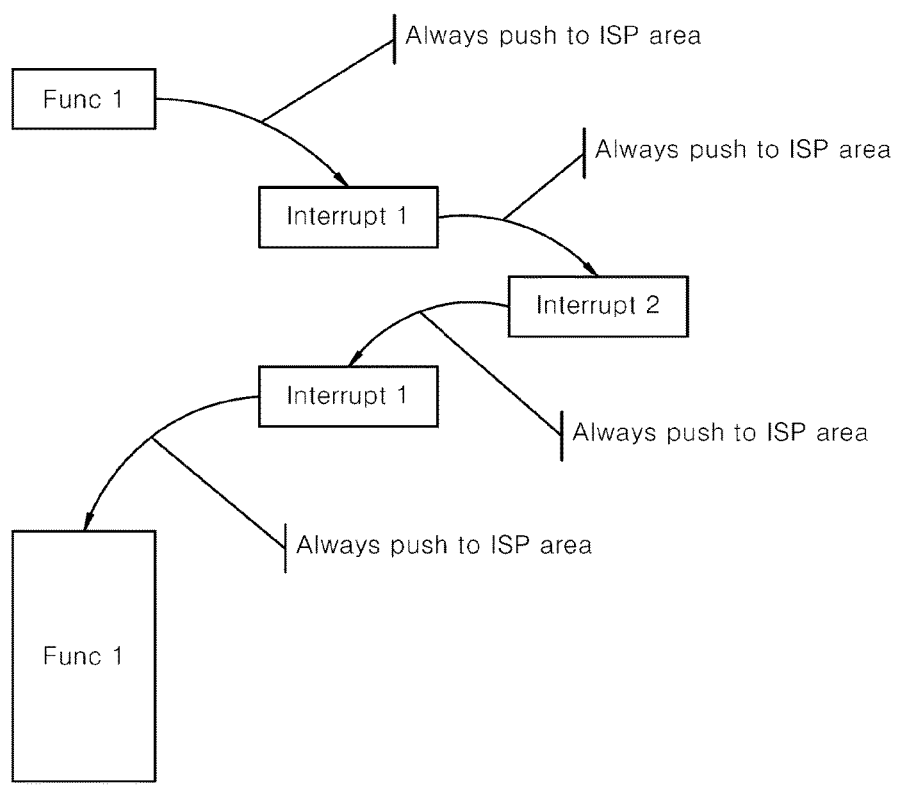
FIG. 7 is a diagram illustrating a storage area of a current stack at an interrupt call in the method of independent control period allocation of axes in the PLC positioning system according to some embodiments of the present disclosure.

FIG. 7 is a diagram illustrating a storage area of a current stack at an interrupt call in the method of independent control period allocation of axes in the PLC positioning system according to some embodiments of the present disclosure.

Referring to FIG. 7, if an interrupt occurs in all cases where the ISP area or the USP area is used, the positioning control unit 110 performs the push and pop operation using the ISP area.

For example, the positioning control unit 110 pushes to the ISP area if Interrupt1 occurs while performing the task of Func1, and pushes to the ISP area if Interrupt2 occurs while performing the task of Interrupt1.

Again, after completion of the task of Interrupt2, when the task of Interrupt2 is switched to the task of Interrupt1, the positioning control unit 110 pops from the ISP area. In addition, after completion of the task of Interrupt1, when the task of Interrupt1 is switched to the task of Func1, the positioning control unit 110 pops from the ISP area.

In this way, the positioning control unit 110 uses the ISP area when there is no particular manipulation, and stores a current state in the ISP area when a function is called or an interrupt occurs. Even when the USP area is used, the positioning control unit 110 stores a current state in the USP area when a function is called, but may use the ISP area when an interrupt occurs.

Accordingly, the positioning control unit 110 uses an interrupting process so that the ISP area of the two independent tasks can be used for an axis requiring a faster response and the USP area can be used for an axis requiring a slower response.

For convenience, it is here assumed that the faster control period is a first control period and the slower control period is a second control period. Accordingly, the positioning control unit 110 calculates operation data based on the first control period for an axis using the ISP area and calculates operation data based on the second control period for an axis using the USP area. When the first control period begins, position control calculation of the axis using the ISP area begins.

It should be here noted that the calculation of the axis using the ISP area has to be designated to such an extent that the calculation can be completed within a period shorter than the first control period, for example, the calculation time is not longer than the first control period. Tasks are managed in such a way of performing calculation of the axis including the slower control period for a time left before the next control period begins after the calculation of the axis requiring the faster response is completed within the first control period.

Figure 8:
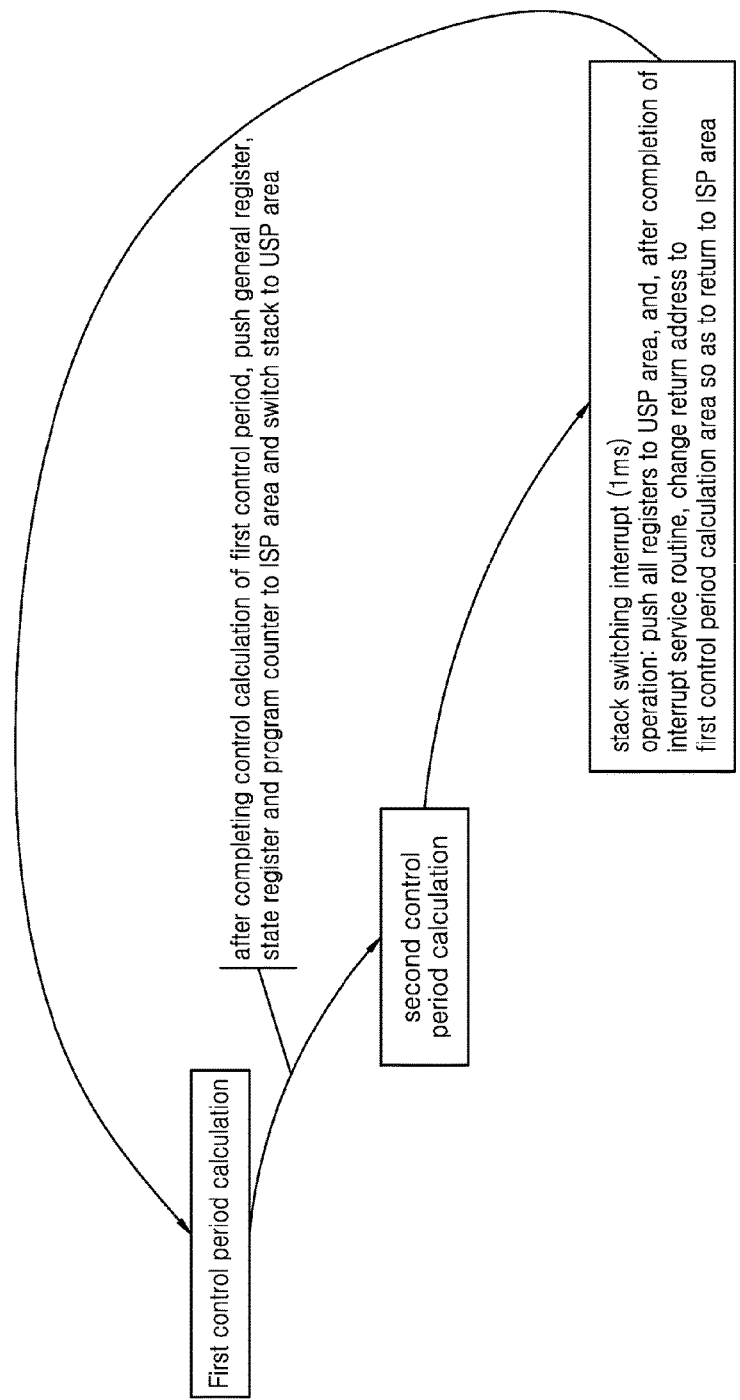
FIG. 8 is a diagram used to explain control calculation of a shorter control period and a longer control period according to some embodiments of the present disclosure.

FIG. 8 is a diagram used to explain control calculation of a shorter control period and a longer control period according to some embodiments of the present disclosure.

Referring to FIG. 8, when beginning to perform operation data calculation, the positioning control unit 110 first begins to perform calculation of the first control period in the ISP area. When all control calculation to be performed within the first control period is finished, a system register of the positioning control unit 110 is used to perform stack switching to the USP area.

When a timer interrupt for position control calculation of the first control period occurs in the course of calculation of the second control period in the USP period, the positioning control unit 110 stops the calculation in the USP area. Then, the positioning control unit 110 performs stack switching to the ISP region after storing a register state in a stack of the USP area. The positioning control unit 110 uses task switching to preferentially perform the position control calculation of the first control period. At this time, since a program pointer points the next step at a point of time when ISP is switched to USP, the calculation of the ISP area makes connection to the USP area.

That is, while using the timer interrupt to calculate the second control period, when a stack switching interrupt (1 ms) occurs at a point of time when the position control calculation of the first control period is requested, the positioning control unit 110 pushes all registers to the USP area. Then, after completion of an interrupt service routine, the positioning control unit 110 changes a return address to the first control period calculation area so as to return to the ISP area. Thereafter, the positioning control unit 110 switches the stack to perform the position control calculation of the first control period. When the position control calculation of the first control period is completed, the positioning control unit 110 pushes the general register, the state register and the program counter to the ISP area. Then, after the stack switching to the USP, the positioning control unit 110 resumes to perform the position control calculation of the second control period.

Figure 9:
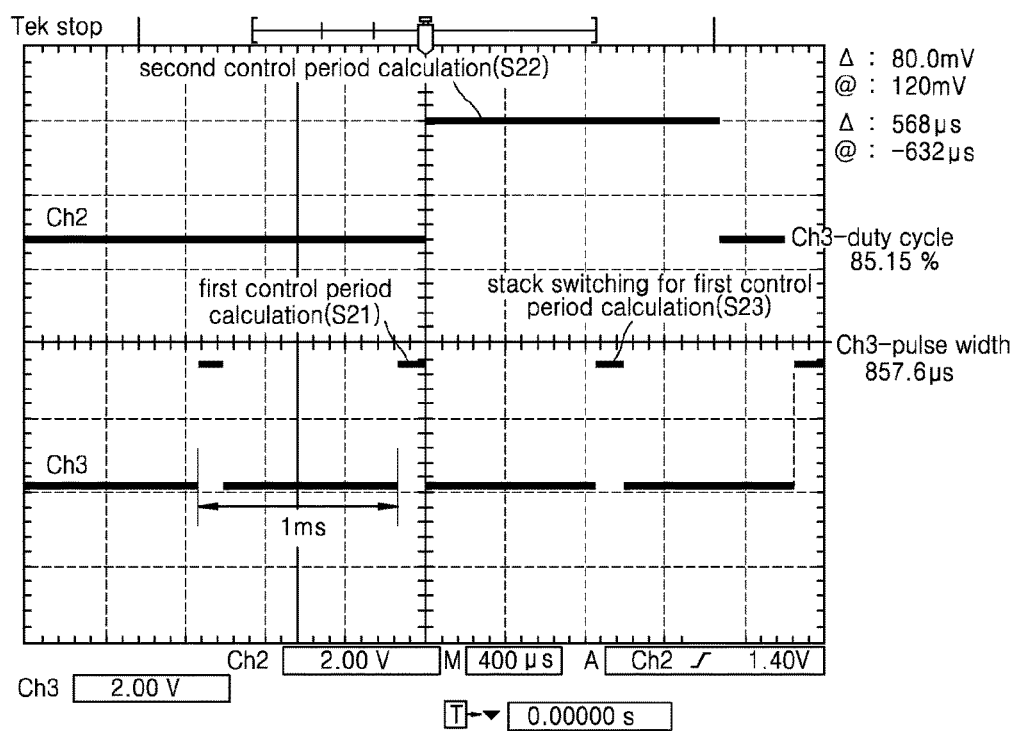
FIG. 9 is a graph for explaining results of simulation on the method of independent control period allocation of axes in the PLC positioning system according to some embodiments of the present disclosure.

FIG. 9 is a graph for explaining results of simulation on the method of independent control period allocation of axes in the PLC positioning system according to some embodiments of the present disclosure.

Referring to FIG. 9, Rx621 MPU (available from Renesas Company) was used to perform a simulation on the method of independent control period allocation of axes in the PLC positioning system according to some embodiments of the present disclosure. In order to check whether an area where a program is being executed is an ISP area or a USP area, an On/Off signal output through a GPIO pin was measured with an oscilloscope. The GPIO pin connected to oscilloscope probe No. 3 (CH3) was switched on during first control period calculation and off after completion of the first control period calculation. For the second control period, this is equally applied to the GPIO pin connected to oscilloscope probe No. 2 (CH2).

The first control period was designated with 1 ms and the second control period was designated with 5 ms. In other words, the second control period is repeated once while the first control period is repeated five times.

In this way, it was confirmed that operation data calculations of two groups including different control periods were performed over time as follows.

As can be seen from FIG. 9, when completing the first control period calculation (S21), the positioning control unit 110 uses second control period task switching to calculate the second control period (S22). Then, in the course of the second control period calculation, when a 1 ms timer interrupt occurs at a point of time when the first control period begins, the positioning control unit 110 performs stack switching in order to perform the position control calculation of the first control period (S23). It can be confirmed from FIG. 9 that the remaining calculation of the second control period continues after completion of the first control period.

It is here noted that the first control period (CH3) and the second control period (CH2) are configured to include a position control calculation execution interval and a margin interval for each axis. Even when the first control period is 1 ms, only some of the entire period of 1 ms is used as the control calculation execution interval in which the control calculation of the first control period is performed, but the other thereof is used as the margin interval. Since each of the control periods includes the control calculation execution interval and the reserved margin interval, when the execution of the first control period is completed, the control calculation of the second control period is performed without waiting during the margin interval.

Figure 10:
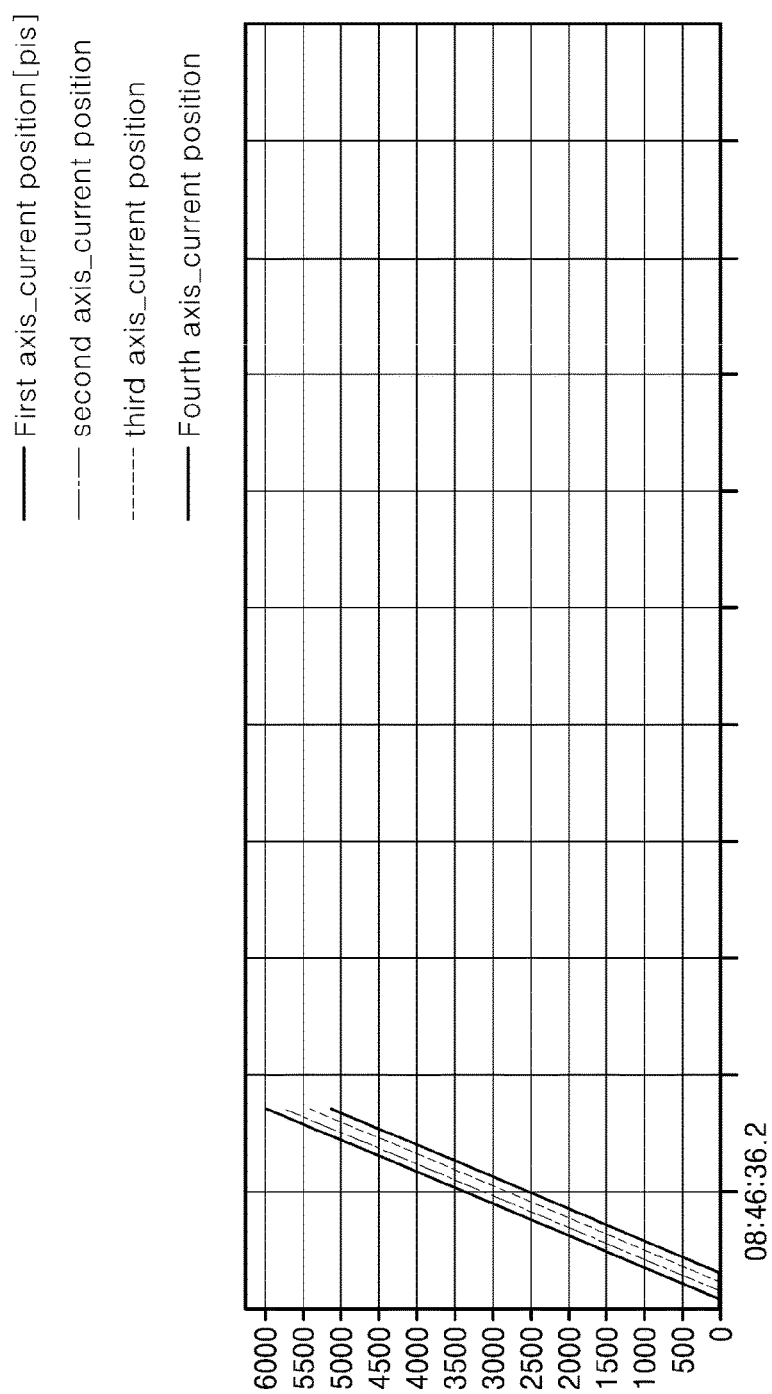
FIG. 10 is a graph for explaining results of simulation on the method of independent control period allocation of axes in the PLC positioning system according to some embodiments of the present disclosure.

FIG. 10 is a graph for explaining results of simulation on the method of independent control period allocation of axes in the PLC positioning system according to some embodiments of the present disclosure.

Results of calculation of first and second axes with the first control period and calculation of third and fourth axes with the second control period are shown in FIG. 10. It can be confirmed from FIG. 10 that the axes move at the same speed and generate the same profile.

According to some embodiments of the present disclosure, the positioning control unit 110 controlling a plurality of axes allocates control periods for the axes independently and grants a calculation priority to an axis requiring a faster response. This can guarantee a response speed of the axis requiring the faster response even with the increased number of control axes.

In the industrial fields, there are axes which are more sensitive to a response speed and axial synchronization, as in articulated robots and the like, and axes which are less sensitive to a response speed and axial synchronization, as in conveyer belts and the like. According to some embodiments of the present disclosure, by allocating axes controlling the articulated robots and the like to the first axis group and allocating axes controlling the conveyer belts and the like to the second axis group, it is possible to flexibly control a servo-drive even in a large-scaled system.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of independent control period allocation of axes in a PLC positioning system, comprising:
dividing the axes into a first axis group having a first control period requiring an immediate response and a second axis group having a second control period requiring a non-immediate response;
allocating a stack of an interrupt stack pointer (ISP) area for axes in the first axis group and allocating a stack of a user stack pointer (USP) area for axes in the second axis group based on required response speed;
receiving a request for a position control calculation of the first axis group during a position control calculation of the second axis group;
performing the position control calculation of the first axis group through task switching to the ISP area; and
in response to completing the position control calculation of the first axis group, resuming the position control calculation of the second axis group through task switching to the USP area.

2. The method according to claim 1, wherein a single axis is designated to the first axis group.

3. The method according to claim 1, wherein a plurality of axes are designated to the first axis group.

4. The method according to claim 1, wherein each of the first control period and the second control period includes a position control calculation execution interval and a margin interval for each axis group.

5. The method according to claim 4, wherein resuming the position control calculation of the second axis group includes:
in response to completing the position control calculation of the first axis group during the position control calculation execution interval of the first control period, performing task switching for the position control calculation of the second axis group; and
resuming the position control calculation of the second axis group during the margin interval of the first axis group.

6. The method according to claim 1, wherein the first control period is designated so that calculation of an axis using the ISP area can be completed within the first control period.

7. The method according to claim 1, wherein performing the position control calculation of the first axis group includes: while performing the control calculation of the second control group, when a stack switching interrupt occurs at a point of time when the position control calculation of the first control period is requested, pushing all registers to the USP area, and, after completion of an interrupt service routine, changing a return address to a first control period calculation area so as to return to the ISP area, and
wherein the act of resuming the position control calculation of the second axis group includes: when completing the control calculation of the first control period, pushing a general register, a state register and a program counter to the ISP area and, after stack switching to the USP area, resuming to perform the control calculation of the second control period.

\* \* \* \* \*